United States Patent
Singh et al.

(10) Patent No.: US 11,971,883 B2
(45) Date of Patent: Apr. 30, 2024

(54) NESTED QUERY MODIFICATION TOOL

(71) Applicant: Oracle International Corporation, Redwood Shores, CA (US)

(72) Inventors: Prashant Singh, Lexington, MA (US); Rasika Vaidya Kaura, Dublin, CA (US); Henrik Michael Ammer, Auburn, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/326,795

(22) Filed: May 31, 2023

(65) Prior Publication Data

US 2023/0306019 A1  Sep. 28, 2023

Related U.S. Application Data

(63) Continuation of application No. 17/958,073, filed on Sep. 30, 2022, now Pat. No. 11,714,806, which is a continuation of application No. 17/449,201, filed on Sep. 28, 2021, now Pat. No. 11,494,373.

(60) Provisional application No. 63/200,474, filed on Mar. 9, 2021, provisional application No. 63/155,817, filed on Mar. 3, 2021, provisional application No.
(Continued)

(51) Int. Cl.
| | |
|---|---|
| G06F 16/242 | (2019.01) |
| G06F 3/0482 | (2013.01) |
| G06F 3/0486 | (2013.01) |
| G06F 16/2453 | (2019.01) |
| G06F 16/2458 | (2019.01) |

(Continued)

(52) U.S. Cl.
CPC ........ *G06F 16/2428* (2019.01); *G06F 3/0482* (2013.01); *G06F 3/0486* (2013.01); *G06F 16/24535* (2019.01); *G06F 16/2458* (2019.01); *G06F 16/248* (2019.01); *G06F 16/258* (2019.01); *G06F 2203/04803* (2013.01)

(58) Field of Classification Search
None
See application file for complete search history.

(56) References Cited

U.S. PATENT DOCUMENTS

| | | |
|---|---|---|
| 9,330,139 B2 | 5/2016 | Chen et al. |
| 10,275,493 B1 | 4/2019 | Mostak |

(Continued)

FOREIGN PATENT DOCUMENTS

| | | |
|---|---|---|
| CN | 112236765 A | 1/2021 |

*Primary Examiner* — Toan H Vu
(74) *Attorney, Agent, or Firm* — Invoke

(57) ABSTRACT

Techniques for modifying queries in a set of nested queries are disclosed. A graphical user interface displays a query detail region alongside a nested query display region. The graphical user interface includes functionality to provide for modification of queries in the nested set of queries. Based on a selection by a user, a query modification tool promotes a query attribute from a child query to one or more parent queries. Based on another selection by a user associated with one query in the set of nested queries, the system deletes an attribute from each query in the set of nested queries. Responsive to a selection to create multiple conditions for a query rule, the system modifies the functionality of the user interface to enable entry of multiple condition characteristics. Based on a further selection, the system creates the multiple conditions for the query rule.

20 Claims, 10 Drawing Sheets

Related U.S. Application Data

63/148,864, filed on Feb. 12, 2021, provisional application No. 63/147,564, filed on Feb. 9, 2021.

(51) Int. Cl.
*G06F 16/248* (2019.01)
*G06F 16/25* (2019.01)

(56) References Cited

U.S. PATENT DOCUMENTS

| | | |
|---|---|---|
| 10,331,899 B2 | 6/2019 | Pattabhiraman et al. |
| 10,341,172 B1 | 7/2019 | Vanden et al. |
| 10,592,506 B1 | 3/2020 | Thombre et al. |
| 10,817,576 B1 | 10/2020 | Davidovich et al. |
| 11,030,192 B2 | 6/2021 | James et al. |
| 11,216,511 B1 | 1/2022 | Bigdelu et al. |
| 11,263,268 B1 | 3/2022 | Bourbie et al. |
| 11,636,128 B1 | 4/2023 | Bigdelu et al. |
| 11,644,955 B1 | 5/2023 | Singamneni et al. |
| 2004/0243799 A1 | 12/2004 | Hacigumus et al. |
| 2005/0015361 A1 | 1/2005 | Payton et al. |
| 2006/0074878 A1 | 4/2006 | Miller |
| 2006/0235828 A1* | 10/2006 | Dettinger ............ G06F 16/9038 |
| 2007/0136239 A1* | 6/2007 | Lee ..................... G06F 16/2474 |
| | | 707/E17.127 |
| 2009/0055367 A1 | 2/2009 | Colgrave et al. |
| 2010/0161646 A1 | 6/2010 | Ceballos et al. |
| 2013/0247207 A1* | 9/2013 | Hugard, IV ............ G06F 21/57 |
| | | 726/25 |
| 2013/0290294 A1 | 10/2013 | Fuller et al. |
| 2014/0189548 A1 | 7/2014 | Werner |
| 2014/0229462 A1 | 8/2014 | Lo |
| 2015/0120776 A1* | 4/2015 | Gopalan ............. G06F 16/2471 |
| | | 707/769 |
| 2015/0378693 A1 | 12/2015 | Boag et al. |
| 2016/0140166 A1 | 5/2016 | Schechter et al. |
| 2017/0193127 A1 | 7/2017 | Chen et al. |
| 2017/0337232 A1 | 11/2017 | Caspi et al. |
| 2018/0032574 A1 | 2/2018 | Vandenberg |
| 2018/0089263 A1 | 3/2018 | Gerard |
| 2018/0089265 A1 | 3/2018 | Gerard |
| 2019/0188203 A1 | 6/2019 | James et al. |
| 2020/0073983 A1* | 3/2020 | Sen ....................... G06F 16/243 |
| 2020/0342018 A1 | 10/2020 | Lange et al. |
| 2021/0034621 A1 | 2/2021 | Patel et al. |
| 2021/0124781 A1 | 4/2021 | Tabb et al. |
| 2021/0173851 A1 | 6/2021 | Dorne et al. |
| 2022/0329616 A1 | 10/2022 | O'Hearn et al. |

* cited by examiner

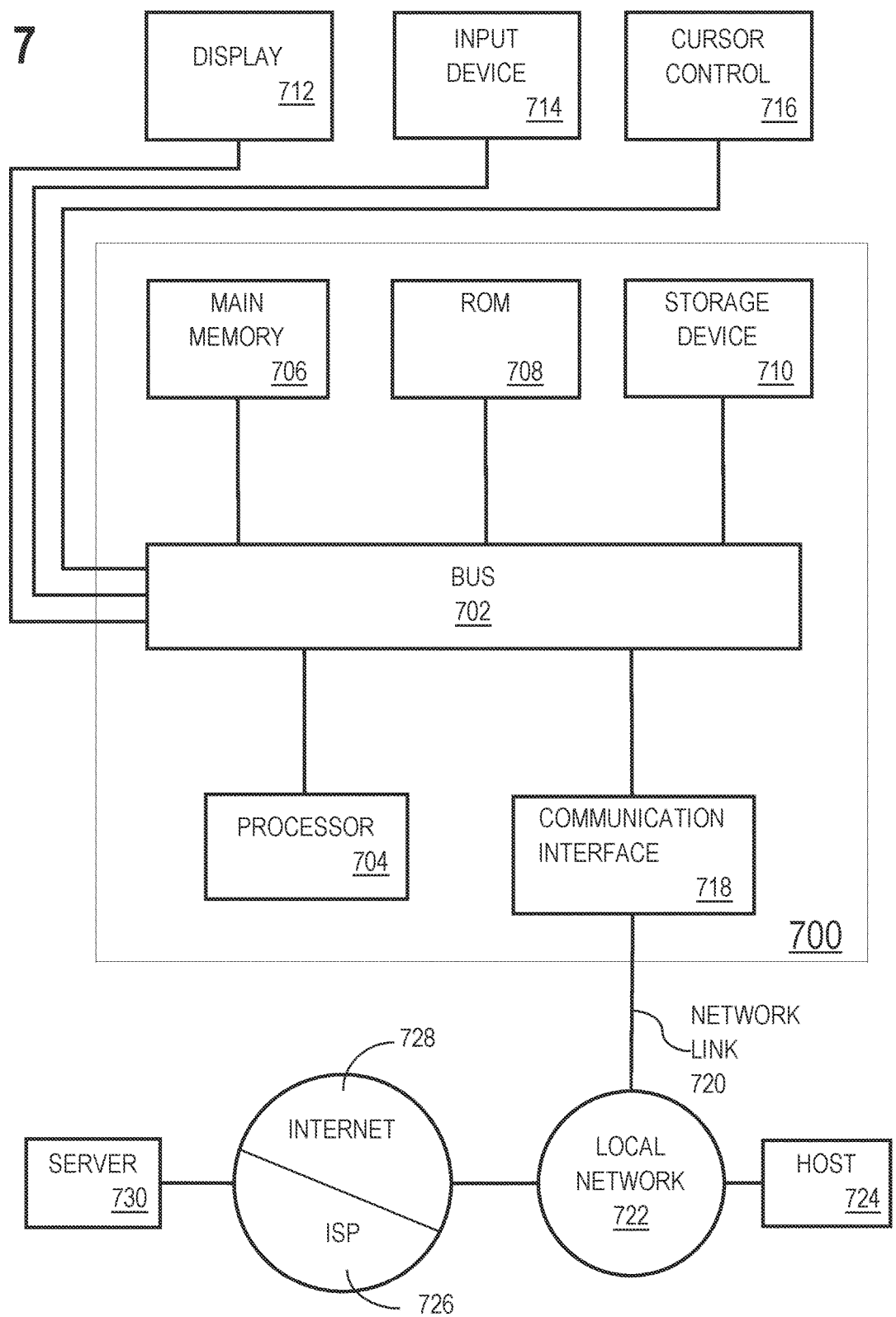

NESTED QUERY MODIFICATION TOOL

INCORPORATION BY REFERENCE; DISCLAIMER

Each of the following applications are hereby incorporated by reference: application Ser. No. 17/958,073, filed Sep. 30, 2022; application Ser. No. 17/449,201, filed Sep. 28, 2021; application 63/200,474, filed Mar. 9, 2021; application 63/155,817, filed Mar. 3, 2021; application 63/148,864, filed Feb. 12, 2021; application 63/147,564, filed Feb. 9, 2021. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to a visualization tool for building nested queries. In particular, the present disclosure relates to a system and user interface including an interactive visual representation of a set of nested queries.

BACKGROUND

Database systems store vast amounts of data that is accessible by end users. To generate actionable information from the data stored in the database system, users execute queries that filter records returned from the database system to only those records applicable to the user. For example, a user may generate a query to retrieve only records from a defined object having defined values for a defined attribute. Often, queries are written with multiple layers of sub-queries, each layer performing one or both of filtering data from a sub-query lower in the hierarchy and filtering data from an object in the database. The sub-queries output attribute data to parent queries. Complex queries may include many layers of nested sub-queries. Each sub-query may include multiple data retrieval operations from one or more objects and/or multiple operations to filter retrieved data prior to outputting the data. As a result of multiple and complex nested relationships between queries, and multiple operations performed by each query, complex queries may appear unintelligible to anyone other than the author of a query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 shows a block diagram that illustrates a computer system in accordance with one or more embodiments.

DETAILED DESCRIPTION

Figure 1:
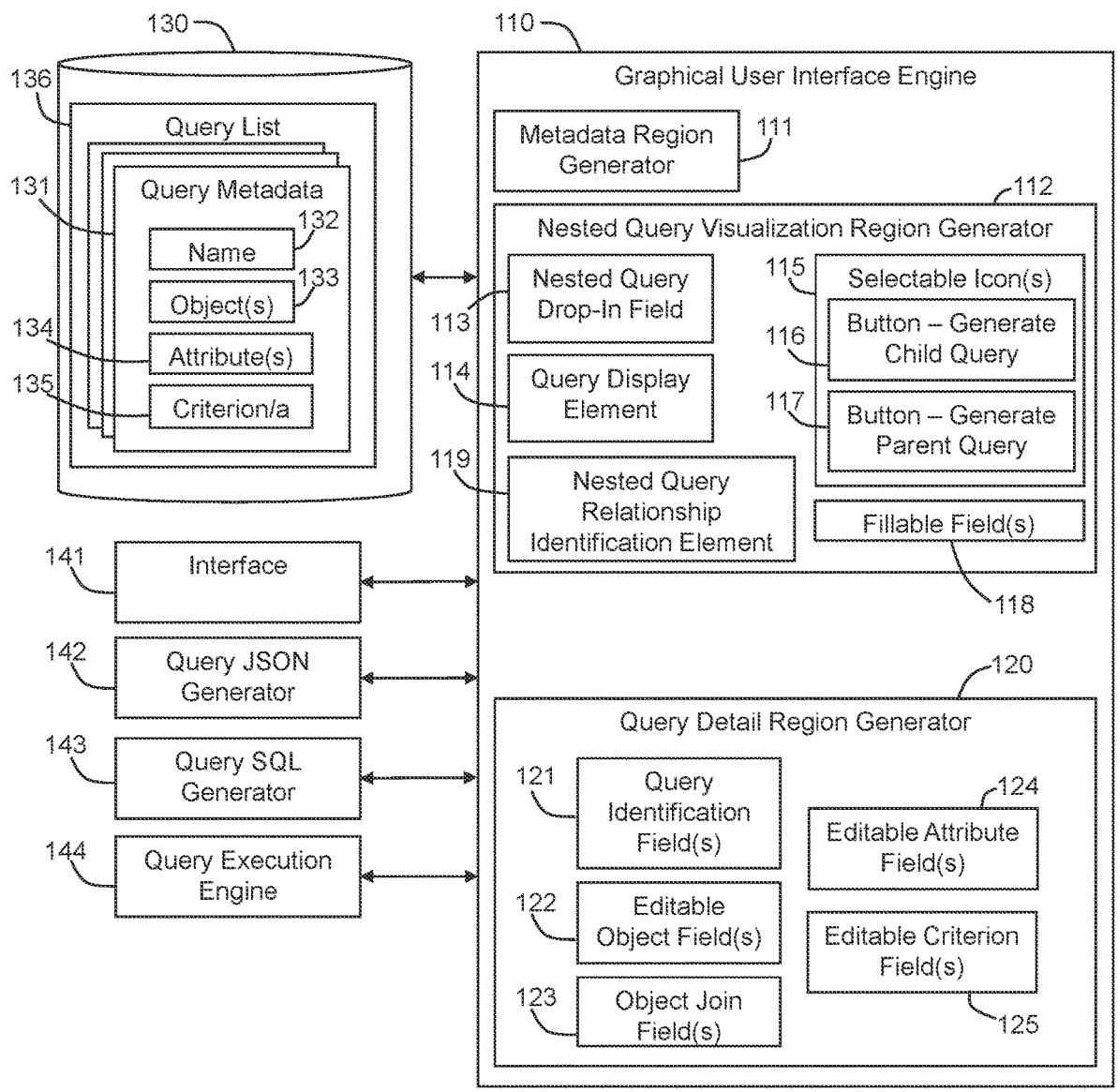
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODIFICATION OF NESTED QUERIES USING NESTED QUERY MODIFICATION TOOL
4. PROMOTING ATTRIBUTES FROM SUB-QUERIES THROUGH A QUERY HIERARCHY
5. REMOVING QUERY ATTRIBUTE FROM SET OF NESTED QUERIES
6. ADDING MULTIPLE CONDITIONS TO QUERY RULES
7. EDITING ALL ENTRIES IN A GROUP OF ENTRIES CORRESPONDING TO QUERY CRITERIA FOR OBTAINING ATTRIBUTE VALUES FROM A DATA OBJECT
8. COMPUTER NETWORKS AND CLOUD NETWORKS
9. MISCELLANEOUS; EXTENSIONS
10. HARDWARE OVERVIEW

1. General Overview

One or more embodiments implement an interactive query builder for a compound query with nested sub-queries. The interactive query builder allows a user to observe, analyze, and modify query characteristics and attributes of a set of nested sub-queries. The system displays an interactive visual depiction of the set of nested sub-queries. The interactive visual depiction includes visual representations of each of the set of nested sub-queries. The visual representations of the nested sub-queries are positioned relative to each other based on the relationships between the nested sub-queries. Accordingly, the interactive visual depiction indicates, via positioning of the visual representations, the relationships between the nested sub-queries.

In one or more embodiments, the system displays user interface elements in the interactive visual depiction of the set of sub-queries. Examples herein refer to specific types of user interface elements such as buttons, icons, and checkboxes. However, these examples are equally applicable to any other type of user interface element. In one example, the system displays a query detail region alongside a nested query visualization region. The query detail region includes buttons and editable fields for editing one or more queries in the set of nested queries. User selection of a button associated with an attribute of a selected query may result in promoting the attribute to one or more parent queries. For example, one button may cause the system to configure an immediate parent query of a selected query to include the selected attribute as an output attribute of the parent query. Selection of another button may cause the system to configure each parent query of a selected query to include the selected attribute as an output attribute. User selection of another button may result in deleting an attribute, associated with a selected query, from one or more additional queries in the set of nested queries. In one or more embodiments, when the system receives a selection to delete an attribute from a selected query, the system provides a visual notification of other queries that also include the attribute prior to deleting the attribute from the selected query.

In one or more embodiments, the system receives a selection associated with a query rule to add multiple conditions to the query rule. The system receives a selection of an object, attribute, and criterion and displays an editable field. Upon receiving multiple attribute values in the editable field, the system generates multiple conditions using the selected criterion applied to the multiple attribute values. In one or more embodiments, the system receives a selection associated with a query rule to edit multiple conditions of the query rule. The system receives a selection of multiple conditions within the query rule and a condition characteristic to be modified. The system edits the condition characteristic for each of the multiple conditions. In one or more embodiments, the system generates a visual representation of a stack of multiple query conditions.

In one or more embodiments, the system generates JSON data describing the compound query displayed by the set of nested queries. The system converts the JSON data to SQL code associated with one or more SQL database dialects. The system may display to the user a preview of one or both of the JSON code and the SQL code prior to executing the SQL code.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a graphical user interface (GUI) engine 110, a data repository 130, an interface 141, a query JSON generator 142, a query SQL generator 143, and a query execution engine 144.

The GUI engine 110 includes a query template region generation 111, a nested query visualization region generator 112, and a query detail region generator 120. The query template region generator 111 obtains query metadata 131 from the data repository 130.

In one or more embodiments, the query metadata 131 includes a list 136 of query templates having different characteristics. Examples of query characteristics included in the metadata include a query name 132, an object 133 associated with the query, attributes 134 input to/output from/operated on by the query, and other criteria 135 defining values obtained by the query. Examples of criteria include operands to be applied to attributes when the query is executed and ranges of values for attributes to be returned when the query is executed.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the graphical user interface engine 110. Alternatively, or additionally, a data repository 130 may be implemented or executed on a computing system separate from the graphical user interface engine 110. A data repository 130 may be communicatively coupled to the graphical user interface engine 110 via a direct connection or via a network.

Information describing query metadata 131 may be implemented across any of components within the system 100. However, this information is illustrated within the data repository 130 for purposes of clarity and explanation.

The nested query visualization region generator 112 generates a nested query visualization region. The nested query visualization region may include, for example, a nested query drop-in field 113. The nested query visualization region generator 112 generates a nested query responsive to detecting a drag-and-drop action of the interface 141. In one or more embodiments, the nested query visualization region includes a visual representation of a query 114. A visual representation of a query 114 may be, for example, a geometric shape, such as a rectangle. The name of the query may be displayed in the geometric shape. In one or more embodiments, selectable buttons 115 are displayed in the visual representation of a query 114. Examples of selectable buttons include a button 116 to generate a child query from the selected query and a button 117 to generate a parent query to the selected query. Other examples include a "details" button, a drop-down menu, and an "edit" button. In one or more embodiments, the visual representation of a query 114 has fillable fields 118 displayed inside the visual representation of a query 114. Examples of fillable fields include a field to edit a query name, to edit an object name associated with the query, to enter attribute names associated with the query, or to enter one or more criteria associated with the query.

In one or more embodiments, a nested query relationship identification element 119 displays a visual representation of a nested relationship between two queries. For example, in an embodiment in which the queries are displayed as geometric shapes, one geometric shape may be arranged relative to the other to indicate a nested relationship. For example, each child query may be offset by its parent query by a pre-defined distance. Examples of nested query relationship identification elements include offsets, spatial relationships between queries, buttons identifying a query as one or both of a parent/child, and color-coding queries.

The query detail region generator 120 generates a query detail region for a selected query. For example, the nested query visualization region generator 112 may display a set of nested queries as geometric shapes. Responsive to detecting a user selection of one of the nested queries, the query detail region generator 120 displays alongside the nested query drop-in field 113 additional fields containing further detail regarding characteristics of the selected query. Query identification fields 121 include, for example, a query name, a name of query metadata used to generate the query, and a unique identifier for the query.

The editable object field 122 is an editable field occupied by the name of the object or objects accessed by the query upon execution of the query. In one or more embodiments, the editable object field 122 includes a drop-down menu or list of selectable objects. In one or more embodiments, the editable object field 122 receives inputs to type or enter an object name, or a portion of an object name, and the query detail region generator 120 searches the objects accessible by the query execution engine 144 to determine if there is a matching object.

The "object join" field 123 receives an input to select one or more additional objects to be added to the selected query. In one or more embodiments, when the system 100 detects a selection of an additional object to be added to the query, the nested query visualization region generator 112 automatically generates a representation of a new child query associated with the selected query.

The editable attribute field 124 receives an input to select attributes that will affect the output of the query. For example, if an object associated with the query includes five attribute fields, the editable attribute field 124 may include a drop-down menu or list of the five attributes stored by the object. The editable attribute field 124 may receive a selection of one or more of the attributes that will be retrieved, excluded, or operated on to generate a query output.

The editable criterion field 125 receives an input to select one or more criteria to be applied to objects, attributes, and/or attribute values to return one or more output values from the query. For example, the editable criteria field 125 may receive an input to include two attribute values and a Boolean AND operator as a criterion to return only records from an object having both of the selected attribute values.

The system 100 includes an interface 141 to allow a user to interact with the graphical user interface engine 110. In one or more embodiments, interface 141 refers to hardware and/or software configured to facilitate communications between a user and the graphical user interface engine 110. Interface 141 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 141 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 141 is specified in one or more other languages, such as Java, C, or C++.

A query JSON generator 142 renders the set of nested queries displayed by the nested query visualization region generator as JSON data format prior to executing the queries. As the graphical user interface engine 110 adds nested queries and modifies characteristics of the queries, the query JSON generator 142 updates the JSON data accordingly. In one or more embodiments, the graphical user interface engine 110 includes a button to display the JSON data format associated with a selected nested query.

A query SQL generator 143 generates the nested queries in SQL language. In one or more embodiments, the graphical user interface engine 110 includes a button to display the SQL code associated with a selected nested query. In one or more embodiments, the SQL generator 143 generates the SQL code associated with a selected query without generating the SQL code for a parent query and/or a child query of the selected query. The JSON data format is agnostic to the particular SQL database format for any particular SQL database system. Accordingly, a set of nested queries visualized by the graphical user interface engine 110 may be converted from a JSON data format into multiple different SQL database formats or dialects. For example, the query SQL generator 142 may convert the same set of JSON data associated with a particular nested query into the Microsoft SQL Server dialect, the Oracle SQL dialect, the MySQL dialect, the PostgreSQL dialect, or any other SQL dialect associated with a particular database system.

A query execution engine 144 executes the nested queries by executing the SQL code to return records from one or more databases. In one or more embodiments, the graphical user interface engine 110 includes a button to execute the SQL code associated with a selected nested query without executing the SQL code associated with a parent and/or child query.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, the graphical user interface engine 110 refers to hardware and/or software configured to perform operations described herein for displaying query metadata, displaying a set of nested queries, and displaying a query detail region for a selected query among the set of nested queries. Examples of operations for displaying and modifying a set of nested queries are described below with reference to the figures that follow.

In an embodiment, the graphical user interface engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Modification of Nested Queries Using Nested Query Modification Tool

Figure 2A:
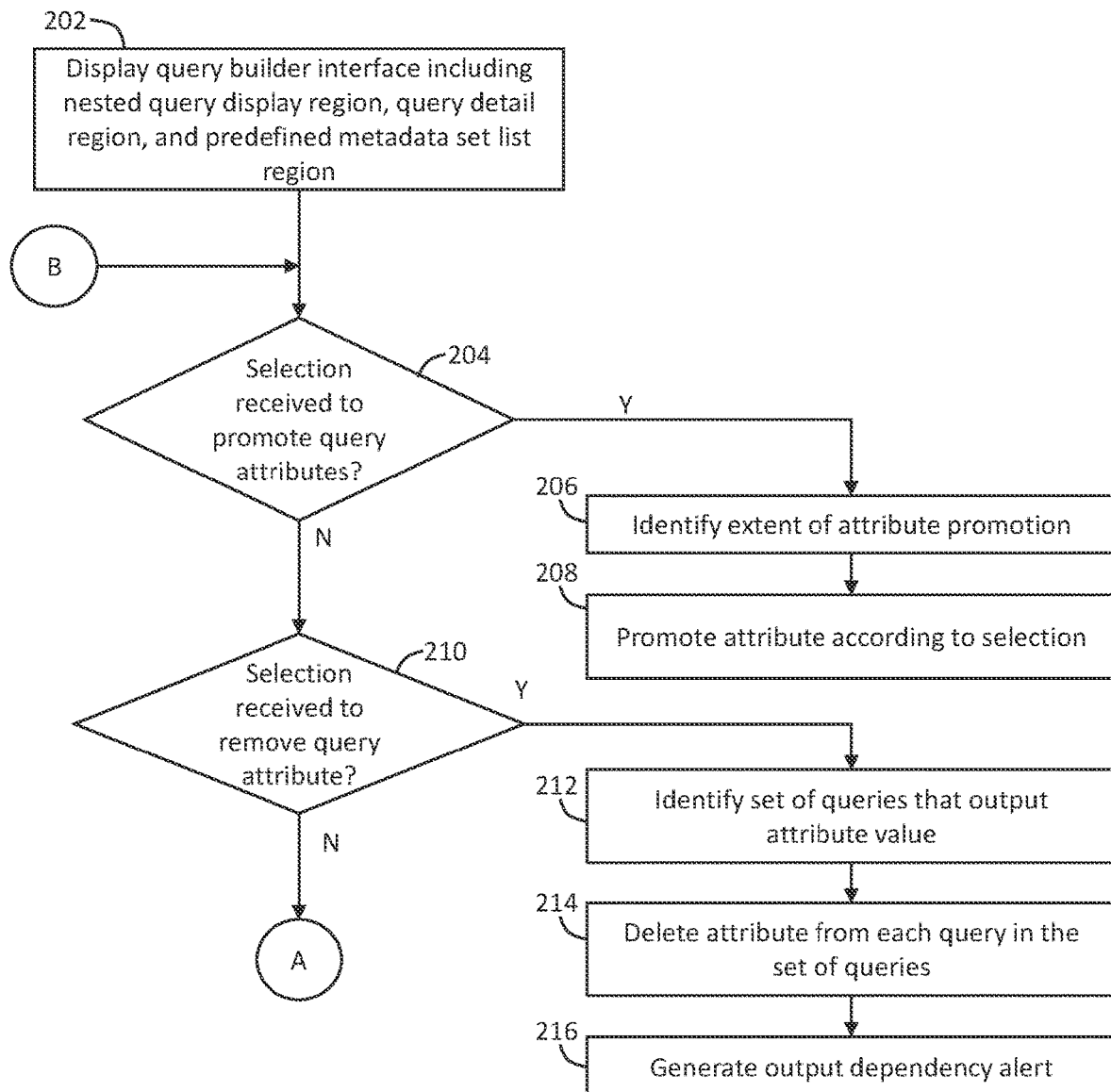
FIGS. 2A and 2B illustrate an example set of operations for modifying queries in a set of nested queries in accordance with one or more embodiments.
Figure 2B:
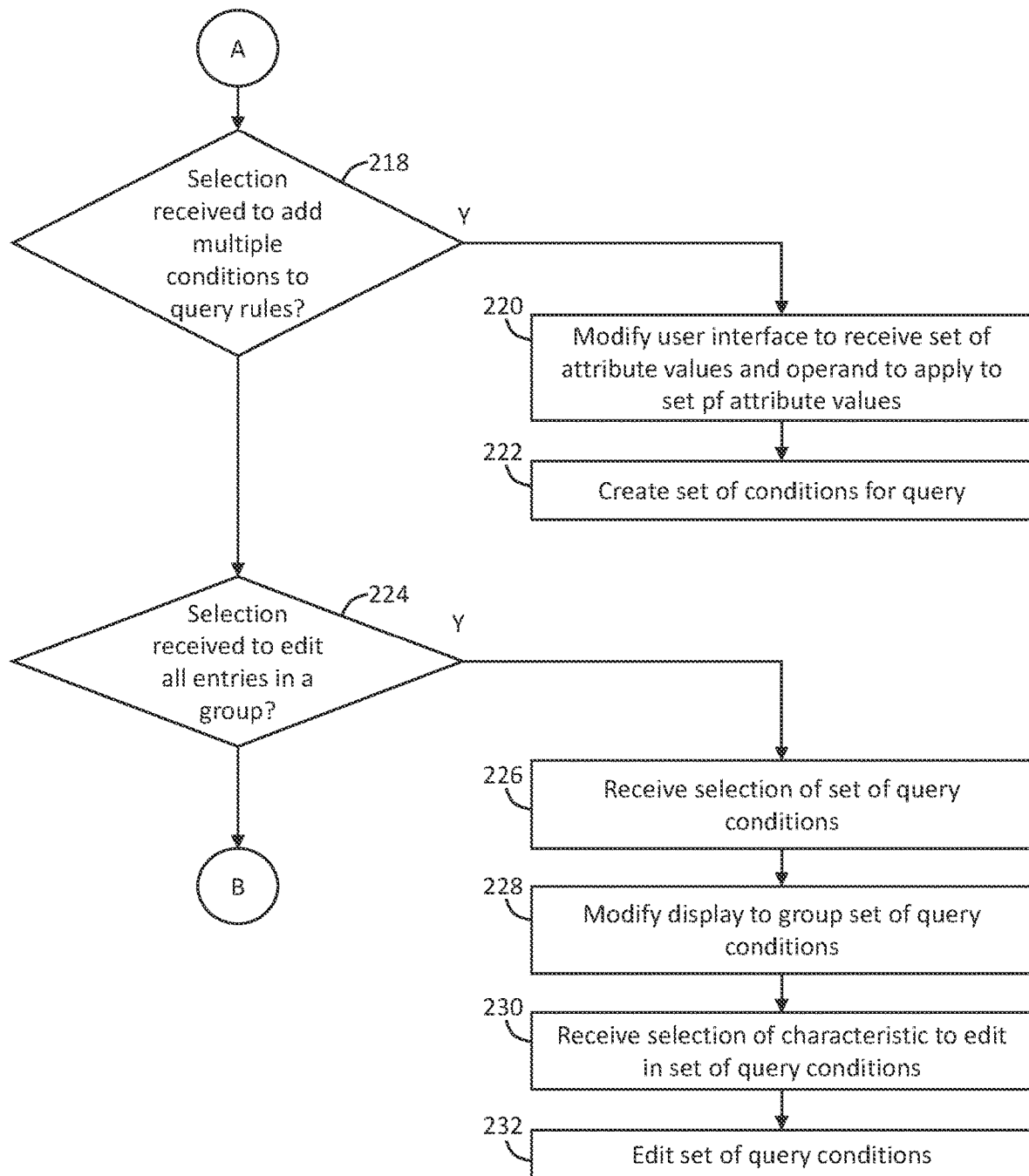

FIGS. 2A and 2B illustrate an example set of operations for modifying nested queries using a nested query modification tool in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

In one or more embodiments, a system displays a query builder user interface (Operation 202). The user interface includes a nested query display region and a query detail region. The nested query display region may be adjacent to, and non-overlapping with, the query detail region. The nested query display region may display a set of nested queries. The set of nested queries may be displayed as a set of distinct visual representations arranged relative to each other to convey a parent/child relationship among the queries.

For example, in one embodiment, each query of a set of nested queries is displayed as a geometric shape on a background. Each geometric shape may be separate from each other geometric shape. The geometric shapes may be separated from each other by a contiguous region of the background, unbroken by connecting elements, such as lines. Instead, a parent/child relationship may be conveyed by the location of each geometric shape relative to each other geometric shape. For example, each child query may be represented as a geometric shape that is arranged below, and indented to the right of, a geometric shape representing its respective parent query. The geometric shape representing the child query may overlap the shape representing the parent query in the horizontal direction without overlapping the shape representing the parent query in the vertical direction. A shape representing a child query may be indented by a pre-defined distance—such as 1.27 centimeters or 0.5 inches. Alternatively, the shape representing the child query may be indented by a certain percentage of the length of the shape. For example, the shape representing the child query may overlap the shape of the parent query along 80% of the length of shape of the parent query.

The query detail region may include a set of editable fields associated with a particular query in the nested query display region. The query detail region may display a set of characteristics associated with a query. The set of characteristics may include a name of a query, a data object associated with the query, a description of the query, output attributes of the query, and criteria associated with the output attributes of the query. The visual representation of the query in the nested query display region may display a sub-set of the set of characteristics. For example, the visual representation of the query in the nested query display region may display only a name of the query. In addition, the visual representation of the query in the nested query display region may not include an editable field.

In one or more embodiments, the query builder interface further includes a third region displaying a list of predefined sets of metadata. The predefined sets of metadata correspond to predefined modifications to existing queries, or to new queries. For example, one set of metadata may specify a data object and a data attribute pertaining to the data object. Another set of metadata may specify one or more functions to be performed by a query on a set of retrieved data.

The system determines whether a selection is received in the query builder interface to promote an attribute of a particular query (Operation 204). For example, in one embodiment, the nested query display region includes an interface element that, when selected, displays a set of attributes for a selected query. The interface element may be a menu icon. The menu icon may include a menu item labeled "promote attribute." Selecting the menu item "promote attribute" may cause the query builder interface to provide additional functionality to a user, including viewing and selecting attributes to be promoted to one or more parent queries. In addition, or in the alternative, the query detail region may include an interface element that, when selected, displays a set of attributes for a selected query. Alternatively, the query detail region may include a sub-region that lists the attributes for a selected query among the set of nested queries in the nested query display region. Each attribute in the sub-region may include a selectable interface element for promoting the attribute to one or more parent queries displayed in the nested query display region.

Based on detecting the selection to promote a query attribute, the system identifies an extent to which the attribute should be promoted (Operation 206). For example, the query builder interface may display one selectable interface element to promote an attribute to only a next-higher-level parent query. The query builder interface may display another selectable interface element to promote the attribute to a top-level parent query. The query builder interface may display another selectable interface element to allow a user to select a particular parent query to which to promote the attribute. The query builder interface may allow the user to select the query to which to promote the attribute with a cursor click on a query in the nested query display region, by selecting a query from a drop-down menu in the query detail region, by typing a name of a query, or by selecting a number of levels to promote the query (with, or without, indicating a name of the query to which the attribute will be promoted).

The system promotes the query attribute based on the selected promotion level (Operation 208). When the system receives an input to promote an attribute, the system configures one or more parent queries to include the selected attribute as an output attribute. The system may extract the attribute from each result in a result set of the query. A parent query may apply a criterion to the attribute to filter results returned by the parent query.

An output attribute may be identified with an object name and an attribute name. For a query obtaining data associated with the attribute from an object in a data repository, the object name is the name of the object in the data repository and the attribute name is the name of the attribute in the data repository. When the attribute is promoted up to one or more parent queries, the system may identify the immediately-preceding child query as the owner of the attribute. In one or more embodiments, the system also configures the attribute name to identify the immediately-preceding query.

If the system does not detect a selection to promote a query attribute, the system may determine whether a selection is received to remove a query attribute from one or more queries (Operation 210). For example, in one embodiment, the nested query display region includes an interface element that, when selected, displays a set of attributes for a selected query. The interface element may be a menu icon. The menu icon may include a menu item labeled "delete attribute." Selecting the menu item "delete attribute" may cause the query builder interface to provide additional functionality to a user, including viewing and selecting attributes to be deleted from one or more additional parent and/or child queries. In addition, or in the alternative, the query detail region may include an interface element that, when selected, displays a set of attributes for a selected query. Alternatively, the query detail region may include a sub-region that lists the attributes for a selected query among the set of nested queries in the nested query display region. Each attribute in the sub-region may include a selectable interface element for deleting the attribute from one or more additional parent and/or child queries displayed in the nested query display region.

The system may search the other queries in the set of nested queries to identify any other queries associated with the attribute. The system deletes the attribute from any queries associated with the attribute. For example, the selected query may pass the attribute to one parent query, and the parent query may pass the attribute to another parent query. The system may delete the attribute from both parent queries. In addition, the selected query may receive the attribute from a child query. The system may delete the attribute from the child query. If the child query is an end of a hierarchy of queries, and if the child query includes no other attributes, the system may delete the child query.

In one or more embodiments, the system generates a visual indicator for each query in which the attribute appears. For example, the system may highlight each query that includes the attribute as an input to the query or an output from the query. The system may generate a notification to a user selecting the "delete" button to inform the user that other queries in the set of nested queries use the selected attribute.

If the system determines that one or more additional queries either: (a) include the attribute as an output attribute, or (b) operate on the attribute to generate an output attribute, the system may generate an alert (Operation 216). The alert may identify the additional queries in the set of nested queries that (a) include the attribute as an output attribute, or (b) operate on the attribute to generate an output attribute. The system may refrain from deleting the attribute from any query until a user confirms the instruction to delete the attribute.

If the system does not detect a selection to remove a query attribute from the set of nested queries, the system may determine whether a selection is received to simultaneously generate multiple conditions for a particular query (Operation 218). The query detail region may display query characteristics for a selected query. The query detail region may further include a selectable interface element to simultaneously generate multiple conditions for the selected query.

Upon detecting the selection to add multiple conditions to the query, the system may generate an editable field. The editable field provides additional functionality to the query builder interface to receive multiple attribute values corresponding to a selected attribute. For example, if an attribute name is "email address," the editable field may receive multiple different email addresses as attribute values. The system receives a selection for an operand to be applied to the multiple attribute values. Based on the attribute values and the selected operand, the system simultaneously generates a set of conditions for the query (Operation 222). Each condition, among the set of conditions, corresponds to the operand applied to a separate attribute value. For example, a user may cut-and-paste a list of 500 user ID's for an attribute name "User ID" and select an operand "equals." The system would modify the selected query to return only records that include one of the 500 user ID's as an attribute value.

If the system does not detect a selection to generate multiple conditions for a particular query, the system may determine whether a selection is received to edit the same field in a selected set of conditions in a query (Operation 218). The query detail region may display multiple query conditions. Each condition acts as a filter for retrieving data from an object. Each condition specifies an attribute name of an attribute of the object, a criterion to be applied to the attribute, and a value to be filtered by the criterion.

A user selects a set of conditions having characteristics to be edited (Operation 226). A user may select multiple conditions by, for example, (a) individually selecting each condition, (b) dragging a cursor over the conditions, or (c) specifying a characteristic of the conditions to be edited.

The system may modify the user interface to display the group of selected conditions (Operation 228). For example, if the system detects the selection of more conditions than may be fit in one display region, the system may display a graphic indicating a number of selected conditions exceeds the conditions in the viewable area. The display may include a user-selectable interface element to allow a user to view additional conditions that may initially be outside a viewing area. The system may modify the user interface display to allow the modification of more conditions than can be displayed in a display region. For example, if a display region is capable of displaying five query conditions, and if the system detects the selection of six or more query conditions to be edited, the system may replace the visual representation of the first query conditions with a new visual representation representing the six or more query conditions. For example, the system may display a single rectangular geometric shape and text "+50" to indicate a selection of 50 conditions to be edited. Replacing a first set of visual representations of each individual condition with a single visual representation representing all of the selected query conditions allows a user to visualize a number of selected conditions without the need to scroll down a display window.

The system receives an input to select a condition characteristic to be edited in all of the selected conditions (Operation 230). For example, a user may select an operand to be edited in each selected condition. If an initial operand for 200 selected conditions is "OR," the system may detect a selection to edit the operand to an "AND." In another example, if an initial attribute name for 100 selected conditions is "Client," the system may detect a selection to edit the attribute name to "Customer." In one embodiment, selecting an attribute name as a characteristic to be edited results in the system displaying a list of attribute names associated with a selected object. A user may select from among the attribute names associated with the object.

In an example in which the system changes the display for a set of selected conditions from displaying each individual condition to displaying a single visual representation for all of the selected conditions, the single visual representation may include editable fields representing characteristics that may be simultaneously edited across all of the selected conditions. For example, selecting an editable field "attribute name" in the single visual representation may facilitate the editing of the attribute name associated with each selected query conditions to a same attribute name value. Similarly, selecting an editable field "criterion" in the single visual representation may facilitate editing the criteria applied to all of the selected conditions to be a same criterion value.

Based on receiving the input to select the condition characteristic to be edited, the system edits the selected characteristic in each of the selected query conditions (Operation 232). The system may edit the characteristics of each selected condition based on receiving only one selection via an interface element of a user interface. For example, once a user has selected a set of conditions to edit and at least one characteristic to edit in each of the selected conditions, the user may interface with a single interface element, such as a button labeled "edit" to initiate the editing of each of the selected conditions.

In one embodiment, the nested queries in the nested query display region define a compound query. As the system updates the queries based on input to the query detail region, the system generates JSON data describing the compound query. The JSON data may be SQL-database-agnostic. The system may use the same JSON data to generate SQL-database code for multiple different SQL databases having different SQL dialects.

4. Promoting Attributes from Sub-Queries Through a Query Hierarchy

Figure 3:
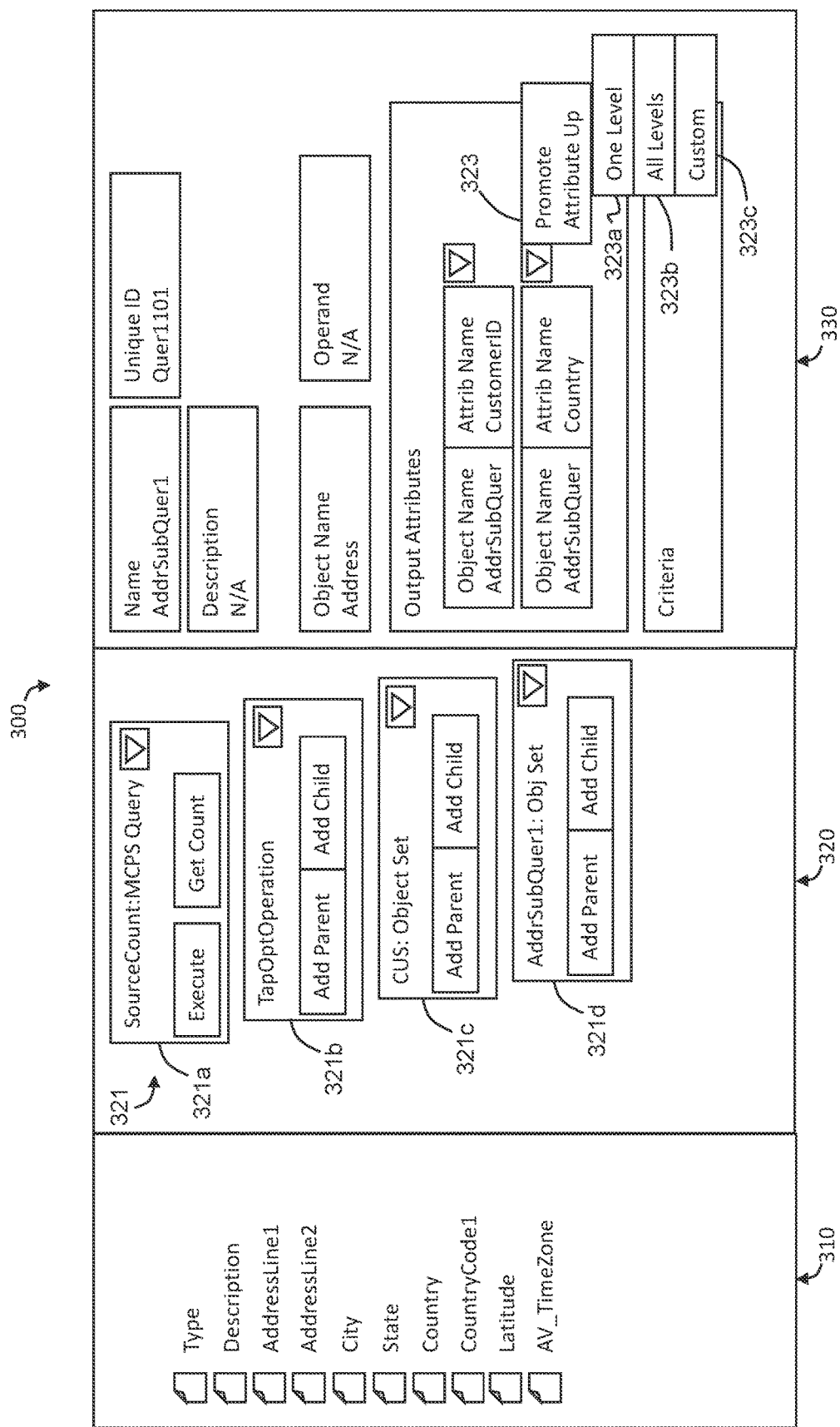
FIG. 3 illustrates an example embodiment of a user interface for promoting an attribute in a hierarchy of nested queries.

FIG. 3 illustrates an example embodiment of a graphical user interface (GUI) for promoting attributes through a set of nested queries. In one or more embodiments, an interactive graphical user interface (GUI) 300 includes a selectable metadata region 310, a nested query display region 320, and a query detail region 330. In one or more embodiments, a system displays one or both of the selectable metadata region 310 and the query detail region 330 simultaneously with the nested query display region 320.

The nested query display region 320 displays visual representation of a set of nested queries 321. In the example illustrated in FIG. 3, the visual representation 321a represents a parent query. Visual representation 321b represents a child query of the query represented by the visual representation 321a. Visual representation 321b is also a parent query of a child query represented by the visual representation 321c. The visual representation 321d is a child query of the query represented by the visual representation 321c. In the description that follows, visual representations 321a-321d may be referred to as "queries" for ease of description, even though the visual representations 321a-321d only visually represent queries.

The queries 321a-321d are arranged relative to each other to display a visual indicator of their nested relationships relative to each other. Query 321b is indented to the right relative to query 321a to indicate query 321b is a child query of the query 321a. Similarly, query 321c is indented to the right relative to query 321b to indicate query 321c is a child query of query 321b. In the present specification and claims, a child query is a query that is configured to begin execution following a start of execution of a parent query. The child query may be referred to as a nested query. Each of the queries 321a-321d that make up the set of nested queries 321 is a sub-query. The child query may return one or more results to the parent query. In one or more P a e 16 embodiments, the parent query performs one or more operations on results obtained from one or more child queries and outputs a result to any parent query higher in a query hierarchy.

In one or more embodiments, the query detail region 330 includes a button 323 to promote an attribute from a selected query up to one or more parent queries. In the example illustrated in FIG. 3, the query 321d is the selected query. The query 321d includes two output attributes from the object AddrSubQuer—CustomerID and Country. Button 323 generates an instruction to promote the attribute "Country" up the hierarchy of the set of nested queries 321. Button 323a generates an instruction to promote the attribute up to the next query 321c. Button 323b generates an instruction to promote the attribute up through all of the parent queries 321c, 321b, and 321a. Button 323c allows a user to select a custom number of levels of the query hierarchy to promote the attribute.

When the system receives an input to promote an attribute, the system configures one or more parent queries to include the selected attribute as an output attribute. In the example illustrated in FIG. 3, when the system receives an input corresponding to the button 323a to promote the attribute "Country" up one level, the system configures the query 321c to include the attribute "Country" as an output attribute. When the system receives an input corresponding to the button 323b to promote the attribute "Country" up "all levels," the system configures the queries 321c and 321b to include the attribute "Country" as an output attribute. In addition, or in the alternative, the system may also include the query 321a to include the attribute "Country" as an output attribute.

In one or more embodiments, when a query includes an attribute as an output attribute, the system extracts the attribute from each result in a result set of the query. A parent query may apply a criterion to the attribute to filter results returned by the parent query.

In one or more embodiments, an output attribute is identified with an object name and an attribute name. For a query obtaining data associated with the attribute from an object in a data repository, the object name is the name of the object in the data repository and the attribute name is the name of the attribute in the data repository. When the attribute is promoted up to one or more parent queries, the system identifies the immediately-preceding child query as the owner of the attribute. In one or more embodiments, the system also configures the attribute name to identify the immediately-preceding query.

In the example illustrated in FIG. 3, the object name associated with the attribute in the query 321d is "AddrSubQuer" and the name of the attribute is "Country." When the system promotes the attribute to query 321c, the name of the object associated with the attribute is the name of the query 321d ("AddrSubQuer1"), and the name of the attribute "AddrSubQuerCountry." When the system promotes the attribute to query 321b, the system configures the query 321b such that the name of the object associated with the attribute is "CUS" and the name of the attribute is "CustomerCountry."

In one or more embodiments, the GUI 300 generates buttons with additional options for promoting attributes, including promoting an attribute up a number of queries greater than one level and less than all levels and promoting multiple attributes.

In one or more embodiments, the system generates JSON data describing the compound query, made up of the set of nested queries, displayed in the nested query display region 320. When the system detects the input selecting the "promote attribute" button 323 in the query 321d, the system updates the JSON data to include the selected attribute in the selected one or more parent queries.

5. Removing Query Attribute from Set of Nested Queries

In one or more embodiments, the query detail region 330 includes a button 324 to delete an attribute from a selected query and one or more additional sub-queries. The system receives a selection to delete an attribute from a selected query among a set of nested queries. The system searches the other queries in the set of nested queries to identify any other queries associated with the attribute. The system deletes the attribute from any queries associated with the attribute.

In one or more embodiments, the system generates a visual indicator for each query in which the attribute appears. For example, the system may highlight each query that includes the attribute as an input to the query or an output from the query. The system may generate a notification to a user selecting the "delete attribute" button 324 to inform the user that other queries in the set of nested queries 321 use the selected attribute. The system may give the user a warning and ask the user to confirm whether to perform the delete function.

Figure 4:
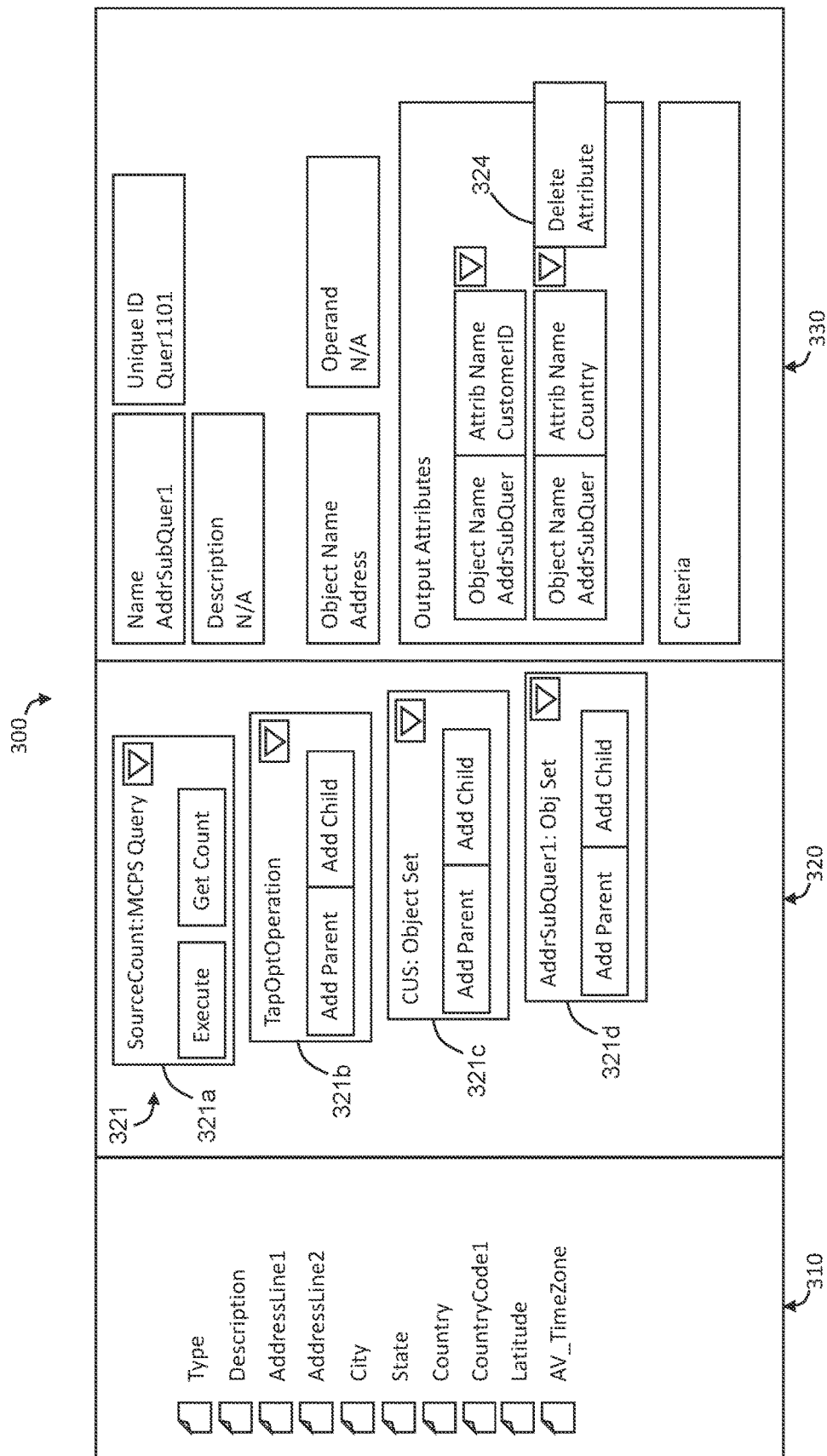
FIG. 4 illustrates an example embodiment of a user interface for deleting an attribute from a set of nested queries.

In the example illustrated in FIG. 4, the query 321c is the selected query. The query 321c includes an output attribute "c_CLDC." The system receives an input corresponding to the button 324 to delete the attribute c_CLDC from among the output attributes of the query 321c. The system searches the other queries, 321b and 321a to determine whether the attribute c_CLDC is obtained or output by these queries. In one or more embodiments, the system deletes the attribute c_CLDC from each query among the set of nested queries 321 in which the attribute appears.

6. Adding Multiple Conditions to Query Rules

Figure 5A:
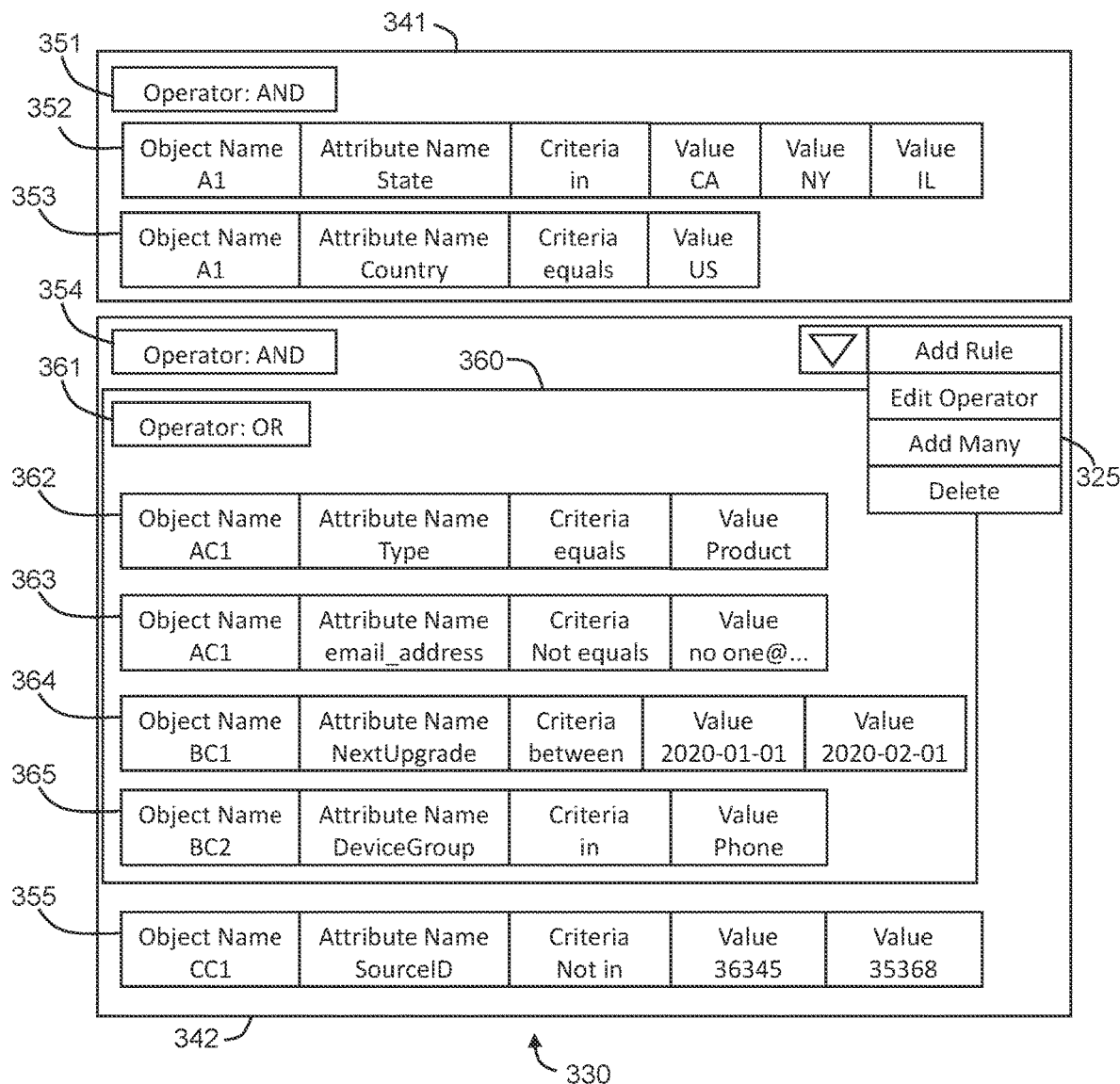
FIGS. 5A and 5B illustrate an example embodiment of a user interface for adding multiple conditions to queries rules.

In one or more embodiments, each query includes one or more rules to specify data to be obtained from an object. A rule includes one or more conditions. Each condition includes an object name. Each object stores records that include at least one attribute, and the attribute includes at least one attribute value. A condition of the query may identify an attribute value or range of attribute values for which the query will return results. The value or range of values is specified by criteria. Examples of criteria that may be used to filter attributes or attribute values of a condition include "equal to," "greater than," "less than," "not equal to," etc. Each rule includes at least one condition. When a rule includes two or more conditions, the query applies an operator to the conditions to filter the results returned by the query. Examples of operators include "OR," and "AND." In the example illustrated in FIG. 5A, the query includes rules 341 and 342. The system applies an "AND" operator 351 to the conditions 352 and 353. The system applies an "AND" operator 354 to the condition 355 and the set of conditions 360. The system applies an "OR" operator 361 to multiple conditions 362, 363, 364, 365, and 366.

Figure 5B:
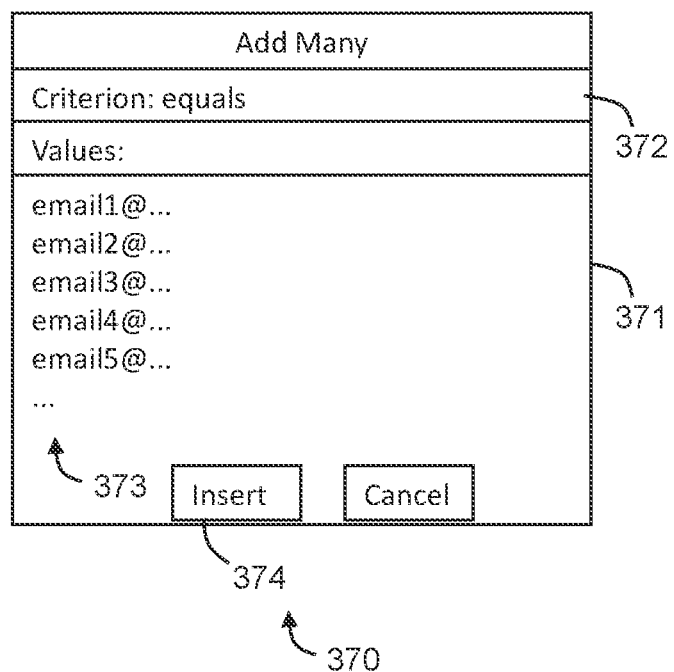

In one or more embodiments, the query detail region 330 includes a button 325 to add multiple conditions to the query. Upon receiving selection of the button 325 to add multiple conditions to the query, the system generates an interface element 370 to receive input values for adding the multiple conditions to the query. In the FIG. 5B, the interface element 370 includes an editable field 371 and a criterion selection field 372. The editable field 371 receives multiple attribute values 373 corresponding to a selected attribute. The system receives in the criterion selection field 372 a selection for a criterion to be applied to the multiple attribute values 373. In FIG. 5B, the selected criterion is "equals." The system generates a condition for each of the listed attribute values. Each condition includes the same criterion applied to a separate attribute value. In the example illustrated in FIG. 5B, the editable field 371 includes multiple email addresses associated with an attribute "email." In one embodiment, a user may cut-and-paste a list from another window or application into the editable field 371. The criterion "equals" is applied to each of the multiple values 373. As a result, the executed query would return from an object only the records having the listed email addresses as attribute values. The interface element 370 further includes an action-initiating interface element 374. In FIG. 5B, the action-initiating interface element 374 is a button. Upon detecting a user interface with the button 374, the system generates, for each attribute value 373, a condition including an attribute value and the criterion.

In one or more embodiments, the system receives multiple attribute values resulting from a cut-and-paste operation. For example, a first set of nested queries may be applied in one system. The first set of nested queries may include a complex query having hundreds of conditions. The system may perform a cut-and-paste operation to cut hundreds of attribute values from the complex query and paste them into an editable field of a query in another set of nested queries. The system may then generate hundreds of conditions in the query of the second set of nested queries without requiring configuring of each individual condition.

Figure 6A:
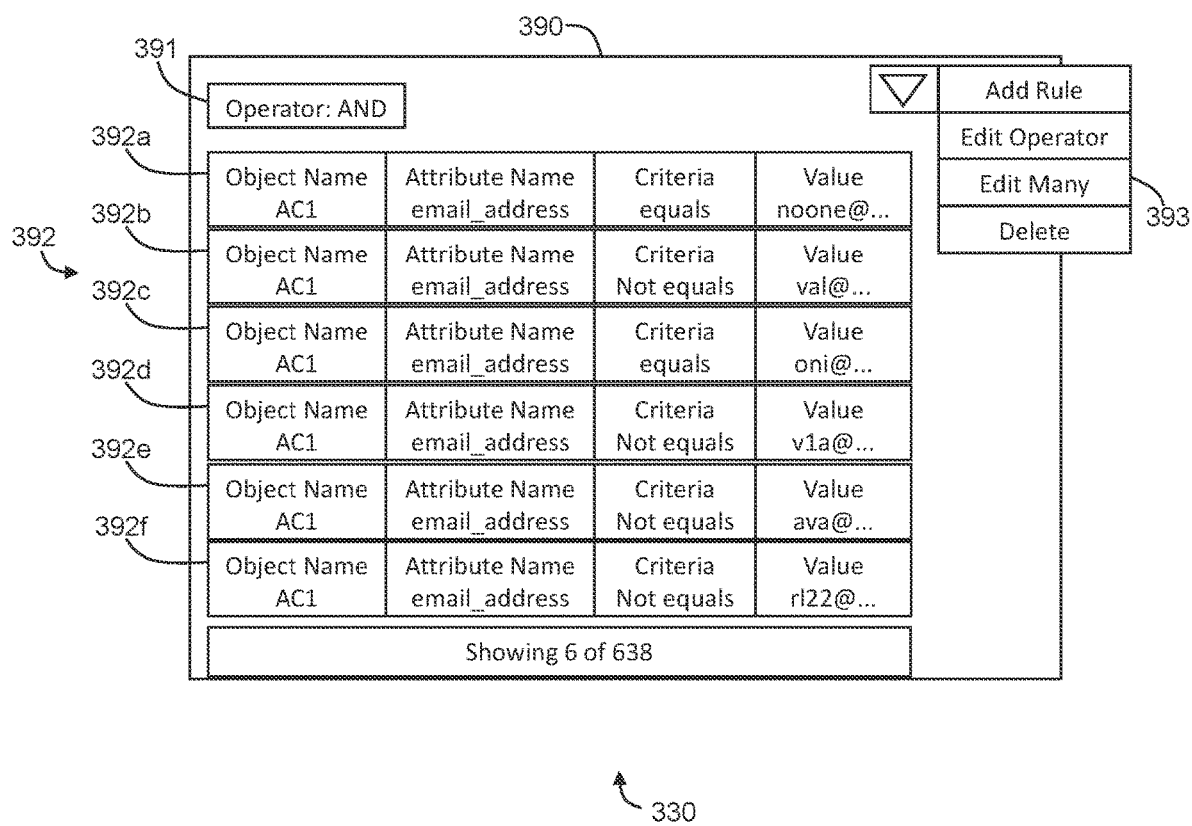
FIGS. 6A and 6B illustrate an example embodiment of a user interface for modifying multiple conditions of queries rules.
Figure 6B:
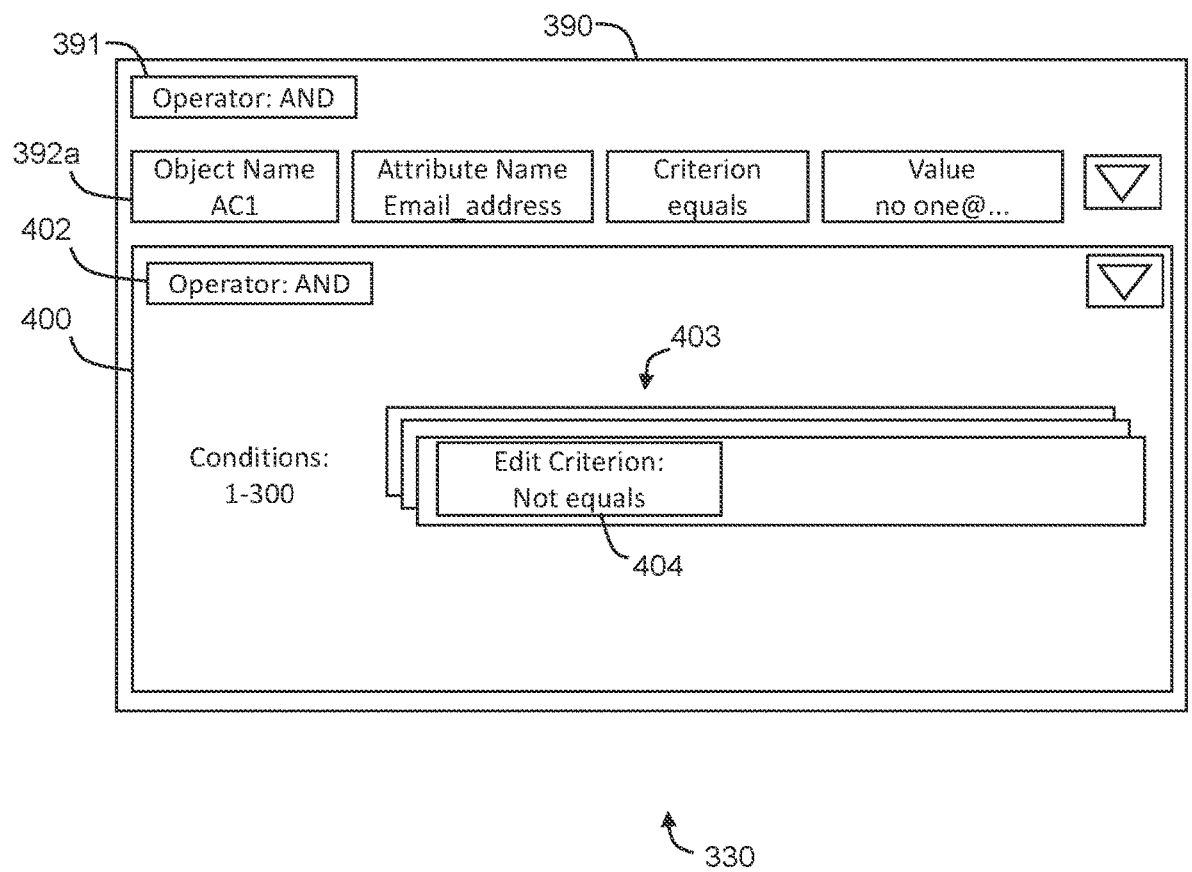

7. Editing all Entries in a Group of Entries Corresponding to Query Criteria for Obtaining Attribute Values from a Data Object FIGS. 6A and 6B illustrate a tool for editing multiple conditions in a rule of a query according to one or more embodiments.

The query detail region 330 may display a rule 390 including conditions 392 and an operator 391. Each condition 392a-392f acts as a filter for retrieving data from an object. Each condition specifies an attribute name of an attribute of the object, a criterion to be applied to the attribute, and a value to be filtered by the criterion. In the example of FIG. 6A, six conditions are displayed within the display area. 638 conditions make up the rule 390. In the example illustrated in FIG. 6A, the query obtains data from the object AC1 and from an attribute "email_address" within the object AC1. The displayed values are email addresses and the criteria "not equals" or "equals" specify which records will be returned by the query.

In one or more embodiments, a system receives an input to select multiple conditions 392. In FIG. 6A, the system displays a button 393 to edit multiple conditions 392. In the example illustrated in FIG. 6B, the multiple conditions selected for editing are too numerous to be displayed within the display area. The system instead displays a stack 403 representing the multiple conditions. The query detail region 330 displays the stack 403 of grouped conditions in a rule 400 including an operand 402. The system receives an input to select a condition characteristic to be edited in all of the selected conditions. In the example illustrated in FIG. 6B, stack 403 includes an editable field 404 to select the "criterion" of the conditions. For example, the system may receive an input to change the criterion in each selected condition to "not equals," to "equals," to "greater than," to "less than," etc. The system then changes the selected condition characteristic in every selected condition.

In one or more embodiments, the stack 403 does not display detailed information for each condition in the stack. For example, in FIG. 6B, the stack represents three hundred conditions. The system does not display three hundred tiles or separate information for the three hundred tiles. Instead, the system displays only the condition characteristic to be modified in all of the selected conditions.

In one or more embodiments, the condition characteristic may be any of an object name, and attribute name, a criterion, and an attribute value. For example, if the attribute value fields for three hundred conditions contain different values, the system may receive an input to change the attribute name for each of the three hundred conditions to a same attribute name. For example, some attribute names may be "Client_Name," some may be "Customer_Name," and some may be "Contact_Name." The editable field 404 of the stack 403 may be "Attribute Name," and the attribute name for all of the conditions in the stack 403 may be changed to "Contact_Name." As another example, different conditions in the stack 403 may have criteria including: "not equal," "equal," and "less than." The editable field 404 of the stack 403 may be "Criteria" and the criterion for all the conditions in the stack 403 may be changed to "not equal."

In one or more embodiments, the selection of multiple conditions is performed using a button displayed in the query detail region 330. In addition, or in the alternative, the selection of multiple conditions is performed by scrolling over the multiple conditions while selecting the multiple conditions. In addition, or in the alternative, the selection of multiple conditions is performed by selecting each of the multiple conditions with a separate selection action. In one or more embodiments, the system allows a user to group conditions by condition characteristics. For example, the system may receive a selection to group every condition having the criterion "greater than" into one group. The system may then receive a selection to edit multiple conditions in the group, up to every condition in the group. For example, the system may receive an input to change the criterion "greater than" to "less than" for every condition in the group. The system edits every selected condition, without requiring the user to edit the conditions one-by-one.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
displaying, in a first region of a graphical user interface (GUI), a plurality of visual representations corresponding respectively to a plurality of nested queries, the plurality of visual representations comprising:
a first visual representation representing a first query of the plurality of nested queries; and
a second visual representation representing a second query of the plurality of nested queries, wherein the second query is a child query of the first query;
wherein the second visual representation is displayed relative to the first visual representation to depict the second query being the child query of the first query;
receiving a first input comprising a plurality of values for use in defining a corresponding plurality of query conditions for a selected query, from among the first query and the second query; and subsequent to receiving the first input comprising the plurality of values:

generating the plurality of query conditions corresponding respectively to the plurality of values, wherein each query condition of the plurality of query conditions is associated with a same operand and a same attribute; and updating the selected query to generate results that match the plurality of query conditions.

2. The non-transitory machine-readable media of claim 1, wherein the operations further comprise:

displaying, in a second region of the GUI and concurrently with displaying the first visual representation and the second visual representation in the first region of the GUI, one or more rows representing one or more query conditions for a rule by displaying, for each of the plurality of query conditions:

a first field displaying at least one attribute characteristic; and a second field displaying at least one operand applied to the attribute characteristic, wherein receiving the first input comprising the plurality of values is responsive to receiving a second input in the second region of the GUI corresponding to the one or more rows representing the one or more query conditions, the second input comprising a user selection of an icon representing adding, with a single user selection, a plurality of query conditions to the selected query.

3. The non-transitory machine-readable media of claim 2, wherein the first input comprises a cut-and-paste operation to cut text content from a second field, a document, or an application and to paste the text content, comprising the plurality of values, into the first field in the GUI.

4. The non-transitory machine-readable media of claim 2, wherein the first field includes a first sub-field specifying an operand, and wherein the same operand associated with each query condition of the plurality of query conditions is specified in the first sub-field.

5. The non-transitory machine-readable media of claim 1, wherein the operations further comprise:

receiving a second input corresponding to the first visual representation;

responsive to receiving the second input:

displaying, in a second region of the GUI and concurrently with displaying the first visual representation and the second visual representation in the first region of the GUI, a first field for displaying the plurality of values for use in defining the corresponding plurality of query conditions for the first query; and responsive to receiving the first input comprising the plurality of values: displaying the plurality of values in the first field.

6. The non-transitory machine-readable media of claim 5, wherein the first field includes a second sub-field specifying an attribute, and wherein the same attribute associated with each query condition of the plurality of query conditions is specified in the second sub-field.

7. The non-transitory machine-readable media of claim 1, wherein the operations further comprise:

displaying, in a second region of the GUI and concurrently with displaying the first visual representation and the second visual representation in the first region of the GUI, one or more rows representing one or more query conditions for a rule;

displaying, in the second region of the GUI and concurrently with displaying the first visual representation and the second visual representation in the first region of the GUI, a query condition-modification field;

responsive to detecting a second input selecting the query condition-modification field, displaying in the GUI:

a first icon representing a first operation to add a single query condition to the selected query; and a second icon representing a second operation to add a plurality of query conditions to the selected query, wherein receiving the first input comprising the plurality of values is responsive to receiving a third input selecting the second icon.

8. The non-transitory machine-readable media of claim 7, wherein the operations further comprise:

receiving a fourth input selecting the first icon representing the first operation to add the single query condition to the selected query;

responsive to receiving the fourth input:

generating a single query condition comprising at least one attribute and at least one criterion; and updating the selected query to generate results that match the single query condition.

9. The non-transitory machine-readable media of claim 7, wherein the operations further comprise:

responsive to detecting the second input selecting the query condition-modification field, displaying in the GUI:

a third icon representing a third operation to add a new rule to a set of rules corresponding to the selected query;

responsive to detecting a fourth input selecting the third icon:

displaying, in the second region of the GUI, a plurality of interface elements including:

at least one field for specifying an operand associated with the new rule; and at least one set of fields specifying a corresponding set of characteristics of at least one query condition associated with the new rule.

10. The non-transitory machine-readable media of claim 1, wherein the operations further comprise:

displaying, by the GUI, a plurality of rows representing query conditions for a rule by displaying, for each of the plurality of query conditions:

a first field displaying at least one attribute characteristic; and a second field displaying at least one operand applied to the attribute characteristic;

wherein the GUI displays the plurality of query conditions as a single first row, and wherein the GUI displays in the first field of the first row a value representing a number of attribute characteristics associated with the plurality of query conditions.

11. A method, comprising:

displaying, in a first region of a graphical user interface (GUI), a plurality of visual representations corresponding respectively to a plurality of nested queries, the plurality of visual representations comprising:

a first visual representation representing a first query of the plurality of nested queries; and a second visual representation representing a second query of the plurality of nested queries, wherein the second query is a child query of the first query;

wherein the second visual representation is displayed relative to the first visual representation to depict the second query being the child query of the first query;

receiving a first input comprising a plurality of values for use in defining a corresponding plurality of query conditions for a selected query, from among the first query and the second query; and subsequent to receiving the first input comprising the plurality of values:

generating the plurality of query conditions corresponding respectively to the plurality of values, wherein each query condition of the plurality of query conditions is associated with a same operand and a same attribute; and updating the selected query to generate results that match the plurality of query conditions.

12. The method claim 11, further comprising:

displaying, in a second region of the GUI and concurrently with displaying the first visual representation and the second visual representation in the first region of the GUI, one or more rows representing one or more query conditions for a rule by displaying, for each of the plurality of query conditions:

a first field displaying at least one attribute characteristic; and a second field displaying at least one operand applied to the attribute characteristic, wherein receiving the first input comprising the plurality of values is responsive to receiving a second input in the second region of the GUI corresponding to the one or more rows representing the one or more query conditions, the second input comprising a user selection of an icon representing adding, with a single user selection, a plurality of query conditions to the selected query.

13. The method claim 12, wherein the first input comprises a cut-and-paste operation to cut text content from a second field, a document, or an application and to paste the text content, comprising the plurality of values, into the first field in the GUI.

14. The method claim 12, wherein the first field includes a first sub-field specifying an operand, and wherein the same operand associated with each query condition of the plurality of query conditions is specified in the first sub-field.

15. The method claim 11, further comprising:

receiving a second input corresponding to the first visual representation;

responsive to receiving the second input:

displaying, in a second region of the GUI and concurrently with displaying the first visual representation and the second visual representation in the first region of the GUI, a first field for displaying the plurality of values for use in defining the corresponding plurality of query conditions for the first query; and responsive to receiving the first input comprising the plurality of values: displaying the plurality of values in the first field.

16. The method claim 15, wherein the first field includes a second sub-field specifying an attribute, and wherein the same attribute associated with each query condition of the plurality of query conditions is specified in the second sub-field.

17. The method claim 11, further comprising:

displaying, in a second region of the GUI and concurrently with displaying the first visual representation and the second visual representation in the first region of the GUI, one or more rows representing one or more query conditions for a rule;

displaying, in the second region of the GUI and concurrently with displaying the first visual representation and the second visual representation in the first region of the GUI, a query condition-modification field;

responsive to detecting a second input selecting the query condition-modification field, displaying in the GUI:

a first icon representing a first operation to add a single query condition to the selected query; and a second icon representing a second operation to add a plurality of query conditions to the selected query, wherein receiving the first input comprising the plurality of values is responsive to receiving a third input selecting the second icon.

18. The method claim 17, further comprising:

receiving a fourth input selecting the first icon representing the first operation to add the single query condition to the selected query;

responsive to receiving the fourth input:

generating a single query condition comprising at least one attribute and at least one criterion; and updating the selected query to generate results that match the single query condition.

19. The method claim 17, further comprising:

responsive to detecting the second input selecting the query condition-modification field, displaying in the GUI:

a third icon representing a third operation to add a new rule to a set of rules corresponding to the selected query;

responsive to detecting a fourth input selecting the third icon:

displaying, in the second region of the GUI, a plurality of interface elements including:

at least one field for specifying an operand associated with the new rule; and at least one set of fields specifying a corresponding set of characteristics of at least one query condition associated with the new rule.

20. A system, comprising:

one or more processors; and memory storing instructions that, when executed by the one or more processors, cause the system to perform operations comprising:

displaying, in a first region of a graphical user interface (GUI), a plurality of visual representations corresponding respectively to a plurality of nested queries, the plurality of visual representations comprising:

a first visual representation representing a first query of the plurality of nested queries; and a second visual representation representing a second query of the plurality of nested queries, wherein the second query is a child query of the first query;

wherein the second visual representation is displayed relative to the first visual representation to depict the second query being the child query of the first query;

receiving a first input comprising a plurality of values for use in defining a corresponding plurality of query conditions for a selected query, from among the first query and the second query; and subsequent to receiving the first input comprising the plurality of values:

generating the plurality of query conditions corresponding respectively to the plurality of values, wherein each query condition of the plurality of query conditions is associated with a same operand and a same attribute; and updating the selected query to generate results that match the plurality of query conditions.

\* \* \* \* \*

UNITED STATES PATENT AND TRADEMARK OFFICE
CERTIFICATE OF CORRECTION

| | |
|---|---|
| PATENT NO. | : 11,971,883 B2 |
| APPLICATION NO. | : 18/326795 |
| DATED | : April 30, 2024 |
| INVENTOR(S) | : Singh et al. |

It is certified that error appears in the above-identified patent and that said Letters Patent is hereby corrected as shown below:

In the Drawings

On sheet 1 of 10 in Figure 1, under Reference Numeral 135, Line 1, and in the representative (print) figure on the title page, delete "Criterion/a" and insert -- Criterion(s) --, therefor.

On sheet 3 of 10, in FIG. 2B, under Reference Numeral 220, Line 3, delete "pf" and insert -- of --, therefor.

In the Specification

In Column 11, Line 40, after "more" delete "P a e 16".

In the Claims

In Column 23, Line 17, in Claim 12, delete "method" and insert -- method of --, therefor.

In Column 23, Line 36, in Claim 13, delete "method" and insert -- method of --, therefor.

In Column 23, Line 41, in Claim 14, delete "method" and insert -- method of --, therefor.

In Column 23, Line 46, in Claim 15, delete "method" and insert -- method of --, therefor.

In Column 23, Line 60, in Claim 16, delete "method" and insert -- method of --, therefor.

In Column 23, Line 65, in Claim 17, delete "method" and insert -- method of --, therefor.

In Column 24, Line 18, in Claim 18, delete "method" and insert -- method of --, therefor.

In Column 24, Line 27, in Claim 19, delete "method" and insert -- method of --, therefor.

Signed and Sealed this
Twenty-second Day of October, 2024

Katherine Kelly Vidal
*Director of the United States Patent and Trademark Office*